United States Patent
Zelesky et al.

(10) Patent No.: US 9,850,773 B2
(45) Date of Patent: Dec. 26, 2017

(54) DUAL WALLED SEAL ASSEMBLY

(71) Applicant: United Technologies Corporation, Hartford, CT (US)

(72) Inventors: Mark F. Zelesky, Bolton, CT (US); Timothy M. Davis, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/724,442

(22) Filed: May 28, 2015

(65) Prior Publication Data
US 2015/0345319 A1 Dec. 3, 2015

Related U.S. Application Data

(60) Provisional application No. 62/005,538, filed on May 30, 2014.

(51) Int. Cl.
*F01D 11/00* (2006.01)
*F16J 15/08* (2006.01)

(52) U.S. Cl.
CPC ......... *F01D 11/005* (2013.01); *F16J 15/0887* (2013.01); *F01D 11/003* (2013.01); *F05D 2240/11* (2013.01); *F05D 2240/55* (2013.01); *F05D 2250/75* (2013.01)

(58) Field of Classification Search
CPC ............. F16J 2015/0837; F02F 11/002; F05D 2250/75; F05D 2240/11; F01D 11/005; F01D 11/003
See application file for complete search history.

(56) References Cited

U.S. PATENT DOCUMENTS

| | | | | |
|---|---|---|---|---|
| 4,602,795 A | * | 7/1986 | Lillibridge | F16J 15/0887 277/644 |
| 4,759,555 A | * | 7/1988 | Halling | F16J 9/18 277/631 |
| 4,798,392 A | * | 1/1989 | Tozer | F16J 15/0887 277/644 |
| 5,240,263 A | | 8/1993 | Nicholson | |
| 6,237,921 B1 | * | 5/2001 | Liotta | F01D 11/005 277/630 |
| 6,352,267 B1 | * | 3/2002 | Rode | F16J 15/0887 277/631 |
| 6,588,761 B2 | * | 7/2003 | Halling | F16L 23/16 277/312 |

(Continued)

FOREIGN PATENT DOCUMENTS

GB 2378486 2/2003

OTHER PUBLICATIONS

EP search report for EP15170065.5 dated Oct. 29, 2015.

*Primary Examiner* — Eugene G Byrd
(74) *Attorney, Agent, or Firm* — O'Shea Getz P.C.

(57) ABSTRACT

A seal assembly that may be for turbine engine includes a first wall defining in-part a first flowpath and a second wall defining in-part a second flowpath having a pressure that is greater than the first flowpath. The second wall has a plurality of metering apertures in fluid communication between the second flowpath and a cavity defined by and between the first and second walls. The walls may be convoluted and generally, resiliently compressed between two substantially opposing surfaces for providing a seal between the two flowpaths.

3 Claims, 4 Drawing Sheets

(56) References Cited

U.S. PATENT DOCUMENTS

| | | | |
|---|---|---|---|
| 7,090,459 B2 * | 8/2006 | Bhate | F01D 11/025 |
| | | | 277/581 |
| 7,152,864 B2 * | 12/2006 | Amos | F01D 11/005 |
| | | | 277/650 |
| 8,016,297 B2 | 9/2011 | Heinemann et al. | |
| 8,596,965 B2 | 12/2013 | Merry et al. | |
| 8,651,497 B2 | 2/2014 | Tholen et al. | |
| 8,961,108 B2 | 2/2015 | Bergman et al. | |
| 9,103,225 B2 | 8/2015 | Lutjen et al. | |
| 9,121,367 B2 | 9/2015 | Karl et al. | |
| 2006/0255549 A1 | 11/2006 | Amos et al. | |
| 2009/0243228 A1 | 10/2009 | Heinemann et al. | |
| 2013/0266416 A1 | 10/2013 | Bergman et al. | |
| 2014/0248127 A1 | 9/2014 | Chuong et al. | |
| 2014/0286751 A1 * | 9/2014 | Brunelli | F01D 11/24 |
| | | | 415/116 |
| 2014/0290213 A1 | 10/2014 | Lefevre et al. | |
| 2014/0290269 A1 | 10/2014 | Lefevre et al. | |

\* cited by examiner

DUAL WALLED SEAL ASSEMBLY

This application claims priority to U.S. Patent Appln. No. 62/005,538 filed May 30, 2014.

BACKGROUND

The present disclosure relates to a seal assembly and, more particularly, to a dual walled seal assembly for a turbine engine.

A turbine engine includes a plurality of seals of varying sizes and shapes to control leakage and gas flow. Many of the seals seal gaps between parts that may be exposed to hot air temperatures and vibration that may contribute toward excessive stresses that, in time, may lead to seal cracks causing air leakage that can degrade engine operating efficiency. Accordingly, each seal should provide a level of durability capable of withstanding wear and mitigating potential cracks and lost engine efficiency as a result of such cracks.

SUMMARY

A seal assembly according to one, non-limiting, embodiment of the present disclosure includes a resilient first wall; and a resilient second wall including a plurality of metering apertures in fluid communication with a cavity defined between the first and second walls.

Additionally to the foregoing embodiment, the inner and outer walls are generally convoluted in a same direction.

In the alternative or additionally thereto, in the foregoing embodiment, the seal assembly includes a first surface; a second surface spaced from the first surface; and wherein opposite edge portions of the first wall are in sealing contact with the respective first and second surfaces thereby resiliently compressing the first wall therebetween.

In the alternative or additionally thereto, in the foregoing embodiment, opposite first and second edge portions of the second wall are in sealing contact between the respective first and second surfaces.

In the alternative or additionally thereto, in the foregoing embodiment, the first and second edge portions of the second wall are in direct sealing contact with the first and second edge portions of the first wall.

In the alternative or additionally thereto, in the foregoing embodiment, the second wall is resiliently compressed between the first and second surfaces.

In the alternative or additionally thereto, in the foregoing embodiment, the first wall has no apertures.

In the alternative or additionally thereto, in the foregoing embodiment, the seal assembly includes a spacer disposed in the cavity between the first and second walls.

In the alternative or additionally thereto, in the foregoing embodiment, the first and second walls are W-shaped in cross section.

In the alternative or additionally thereto, in the foregoing embodiment, the first and second walls are ring shaped and the first wall is a radially inner wall and the second wall is a radially outer wall.

In the alternative or additionally thereto, in the foregoing embodiment, the inner and outer walls each have a splice circumferentially displaced from one-another.

In the alternative or additionally thereto, in the foregoing embodiment, the splice of the outer wall is defined between two opposing end faces of the outer wall that are separated by a circumferential distance, and a radial distance measured between bend portions of each inner and outer wall located between respective opposite edge portions is at least less than the circumferential distance by a factor of ten.

In the alternative or additionally thereto, in the foregoing embodiment, a ratio of the circumferential distance over a diameter of the second wall is greater than 0.004.

In the alternative or additionally thereto, in the foregoing embodiment, the ratio is less than 0.012.

In the alternative or additionally thereto, in the foregoing embodiment, the seal assembly includes a ring-shaped spaced disposed between the bend portions of the inner and outer walls.

In the alternative or additionally thereto, in the foregoing embodiment, the metering apertures are circumferentially spaced from one-another.

A turbine engine seal assembly according to another, non-limiting, embodiment includes a first ring concentric to an axis; a second ring concentric to the axis and spaced axially from the first ring; a circumferentially extending outer wall including a plurality of metering apertures spaced circumferentially from one-another, and the outer wall being in resilient sealing relationship between the first and second rings; a circumferentially extending inner wall spaced at least in part radially inward from the outer wall and resiliently compressed between the first and second rings; and wherein a circumferentially extending cavity is defined between the outer and inner walls that is in fluid communication with the plurality of apertures.

Additionally to the foregoing embodiment, the outer and inner walls are generally W-shaped in cross section each have a mid-bend located axially between upstream and downstream bend portions of each outer and inner wall.

In the alternative or additionally thereto, in the foregoing embodiment, the mid portion of the inner wall is in contact with the mid portion of the outer wall, and the cavity is an upstream cavity defined between the upstream bend portions, and a downstream cavity is defined between the downstream bend portions, and the plurality of metering apertures are in the upstream and downstream bend portions of the outer wall.

In the alternative or additionally thereto, in the foregoing embodiment, the first ring is a BOAS ring and the second ring is a shroud ring of a vane assembly, and the outer wall is located generally between a secondary cooling flowpath and the cavity, and the inner wall is located between the cavity and an engine core flowpath.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
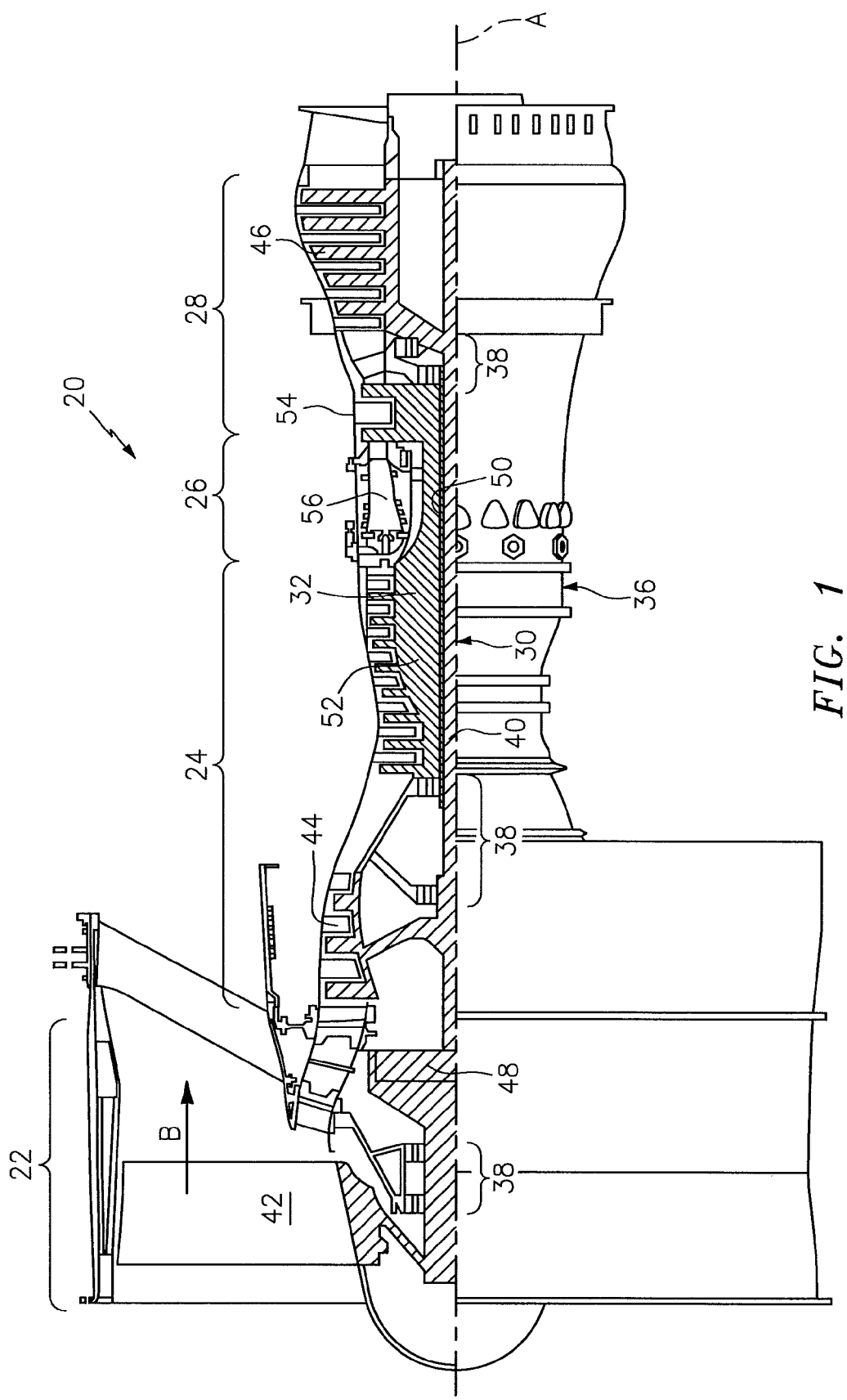
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path 'B' due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1150 fps (351 m/s).

Figure 2:
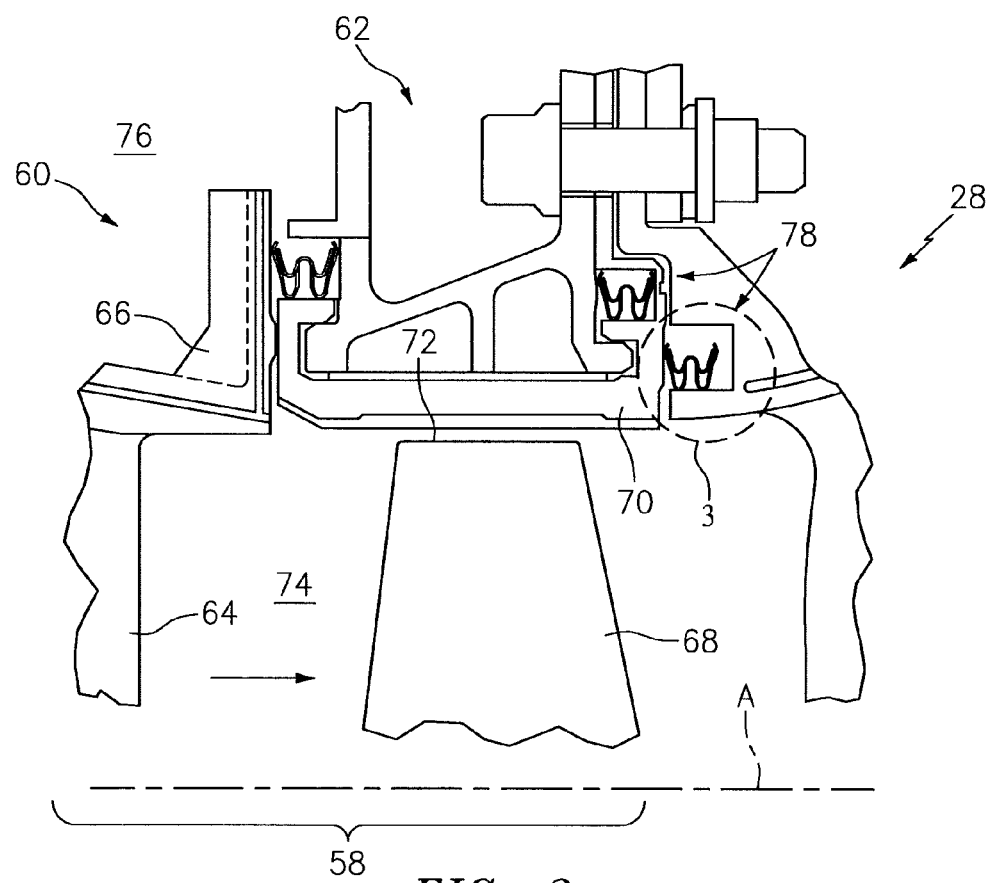
FIG. 2 is a partial sectional view of a turbine section of the engine according to one, non-limiting embodiment of the present disclosure.

Referring to FIG. 2, the turbine section 28 may include a plurality of stages 58 each having a forward, stationary, vane assembly 60 and an axially aft blade assembly 62 generally in the core flowpath. As illustrated, one complete stage 58 is shown along with a vane assembly 60 of an adjacent and downstream stage. Each vane assembly 60 has a plurality of vanes 64 spaced circumferentially from one-another and radially extending between, and supported by, circumferentially extending inner and outer shroud rings 66 disposed concentrically to engine axis A (only the outer shroud ring shown). The shroud rings 66 along with the vanes 64 may be formed as one unitary piece, or each vane 64 or any number of vanes may be formed to a segment of the shroud ring 66, that when assembled, forms a complete ring.

Each blade assembly 62 has a plurality of rotating blades 68 and a stationary shroud ring or blade outer air seal (BOAS) ring 70 that may be segmented circumferentially. The blades 68 are spaced circumferentially from one-another and project radially outward from, and engaged to, a rotor (not shown) centered to the engine axis A and to a distal tip 72 of the blade 68. The distal tip 72 is in close association with the BOAS ring 70 to minimize or eliminate any flow leakage or bypass of hot core engine air flowing (i.e. between the ring 70 and tip 72) through the engine core flowpath 74. The core flowpath 74 may be annular and is generally defined radially between the outer shroud ring 66 of the vane assemblies 60 and the BOAS ring 70, and radially inward by the inner shroud ring 66 and the blade platforms of the blades 68 (not shown). A secondary cooling flowpath 76 may also be annular in shape and may generally be located radially outward from the engine core flowpath 74. The secondary cooling flowpath 76 is defined radially inward by the outer shroud ring 66 and the BOAS ring 70, and radially outward by the engine case 36 (see FIG. 1).

Figure 3:
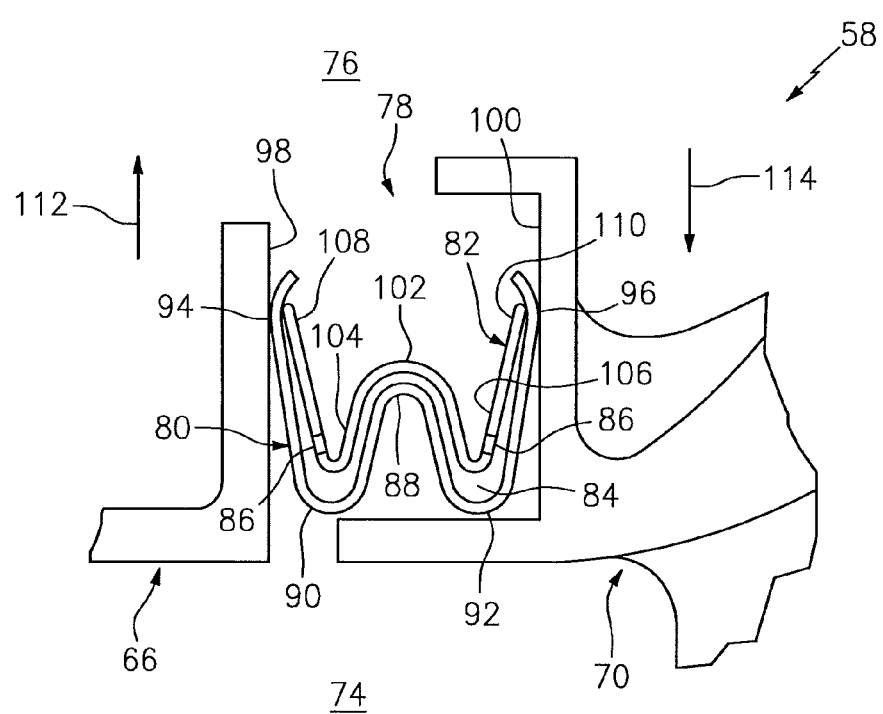
FIG. 3 is an enlarged cross section of a seal assembly taken from circle 3 of FIG. 2.

Referring to FIGS. 2 and 3, at least one annular, dual walled, seal assembly 78 may be located between the outer shroud ring 66 of the vane assembly 60 and the BOAS ring 70 of the blade assembly 62 for the prevention of unwanted cooling air leakage from the secondary cooling flowpath 76 to the hot core flowpath 74. The seal assembly 78 has a solid, radially inward, wall 80 and a perforated, radially outward, wall 82. The inner wall 80 may be compressed axially (with respect to axis A) for resilient and biased sealing contact between the rings 66, 70, and the outer wall 82 may be in sealing contact with the inner wall 80. A cavity 84 is radially defined between the inner and outer walls 80, 82 that is in fluid communication with the secondary cooling flowpath 76 through a plurality of apertures 86 in the outer wall 82. The inner and outer walls 80, 82 and the cavity 84 are generally ring-shaped and extend circumferentially about the engine axis A. The plurality of apertures 86 are spaced circumferentially apart from one-another along the outer wall 82. It is further contemplated and understood that the outer wall 82 may be resiliently compressed axially, like the inner wall 80, and may further be compressed directly against the inner wall 80 (as shown) or directly against the opposing rings 66, 70 for establishing the sealing contact. It is also understood that the walls 80, 82 may not be ring shaped, and as one example, may be linear, and compressed between any two substantially opposing surfaces requiring a seal between two chambers and/or flowpaths.

The inner and outer walls 80, 82 of the seal assembly 78 may both be generally convoluted in shape, and more specifically, may be generally W-shaped in cross section (i.e. taken along an imaginary plane that spans radially and generally contains the engine axis A). The inner wall 80 may have a mid-bend portion 88 located axially between and engaged to upstream and downstream bend portions 90, 92. Opposite edge portions 94, 96 of the inner wall 80 are engaged to the respective bend portions 90, 92 and project substantially radially outward therefrom for biased, sealing, contact with respective and substantially opposing surfaces 98, 100 of the respective rings 70, 66. Similarly, the outer wall 82 may have a mid-bend portion 102 located axially between and engaged to upstream and downstream bend portions 104, 106. Opposite edge portions 108, 110 of the outer wall 82 are engaged to the respective bend portions 104, 106 and may project substantially radially outward therefrom for sealing contact with the respective edge portions 94, 96 of the inner wall 80. It is further contemplated and understood that the inner and outer walls 80, 82 may not be generally W-shaped in cross section and may, for example, be U-shaped or V-shaped in cross section.

Each bend portion 104, 106 of the outer wall 82 has the plurality of apertures 86. The apertures 86 may be holes, slits or other passage for the metered flow of cooling air. The mid-bend portions 88, 102 are generally concave in a radially outward direction (see arrow 112) and the upstream bend portions 90, 104 and downstream bend portions 92, 106 of the respective walls 80, 82 are generally concave in a radially inward direction (see arrow 114). The mid-bend portions 88, 102 may be spaced from one-another, the upstream bend portions 90, 104 are spaced from one-another, and the downstream bend portions 92, 106 are spaced from one-another; thereby, defining the cavity 84 between the walls 80, 82, which may generally be W-shaped in cross section.

Figure 4:
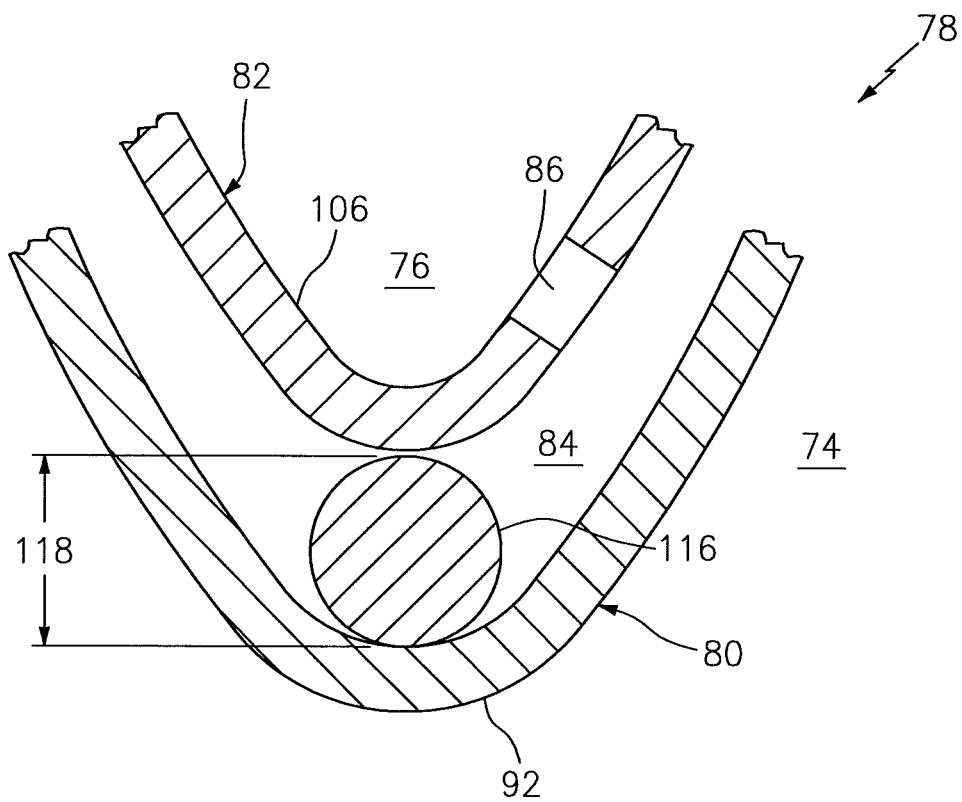
FIG. 4 is an enlarged, partial, cross section of the seal assembly.

Referring to FIGS. 3 and 4, the spacing between upstream bend portions 90, 104 and downstream bend portions 92, 106 of the respective walls 80, 82 may be maintained by respective spacers 116 located in the cavity 84. The spacers 116 may generally be ring shaped and/or circumferentially segmented. The spacing between walls 80, 82 generally at the upstream bend portion 90, 104 and downstream bend portions 92, 106 has a clearance or radial distance (see arrow 118) that is generally equal to or slightly greater than a thickness of the spacers 116 measured in the radial direction. Although the spacers 116 are generally located at the apexes of the bend portions, the metering apertures 86 may be slightly offset from the apex to avoid placement at potential wall stress locations and to assure the spacers do not obstruct cooling air flow. The spacers 116 may further have an irregular surface shape to permit axial cooling air flow (i.e. with respect to the engine axis) from one side of the spacer to the other.

Figure 5:
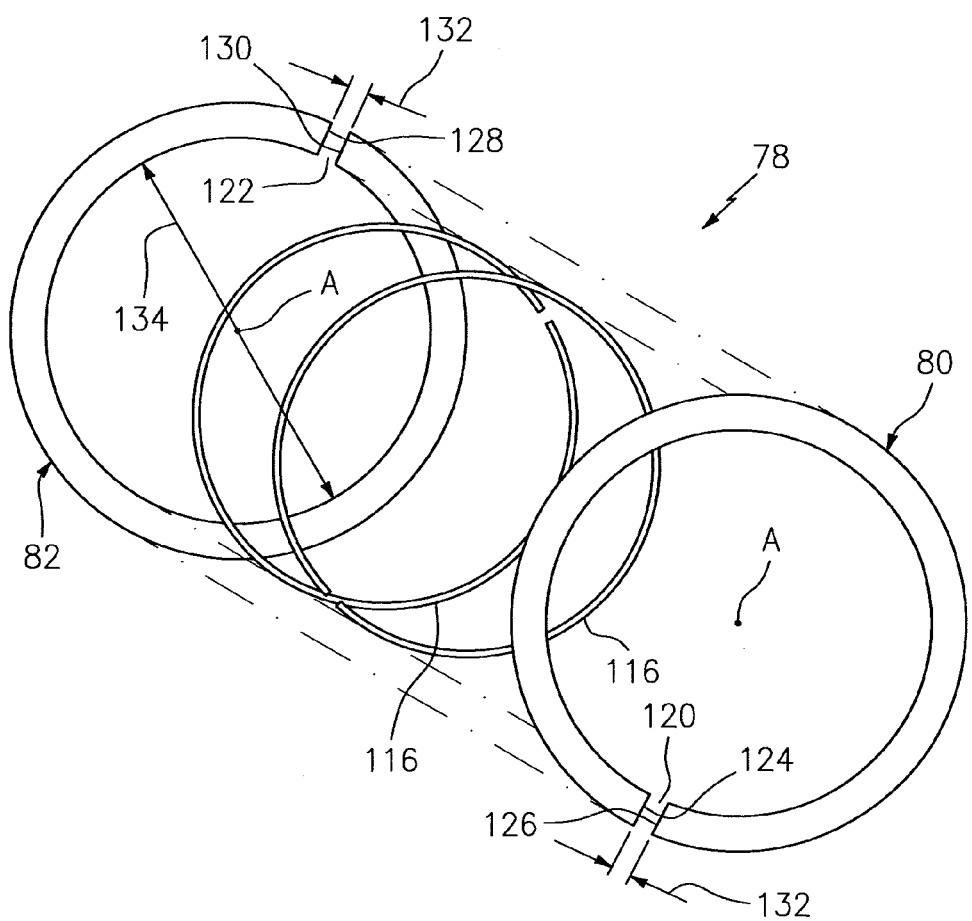
FIG. 5 is an exploded, perspective, view of two walls and spacers of the seal assembly.

Referring to FIGS. 4 and 5, the inner and outer walls 80, 82 may not be circumferentially continuous and may each have respective splices 120, 122 defined between opposing end faces 124, 126 carried by the inner wall 80 and opposing end faces 128, 130 carried by the outer wall 82. The splices 120, 122 may be circumferentially offset from one-another and may be diametrically opposed to one-another for limiting cooling air leakage and for cooling enhancement of the inner wall 80. Each splice 120, 122 may have a splice clearance or circumferential distance (see arrow 132) measured between respective faces 124, 126 and faces 128, 130 such that the radial distance 118 is equal to or less than the circumferential distance 132 by a factor of ten. Yet further, the outer wall 82 may have an inner diameter (see arrow 134 in FIG. 5) such that a ratio of the circumferential distance 132 of the splice 122 over the diameter 134 of the outer wall 82 is within the range of about 0.004 to about 0.012 and preferably within a range of about 0.010 to 0.012. As an example, for a diameter 134 of about two feet (0.61 meters), the circumferential distance 132 is greater than 0.10 inches (0.25 centimeters) and preferably within a range of 0.25 inches (0.64 centimeters) to 0.30 inches (0.76 centimeters), and thus the distance 118 between bend portions 92, 106 is greater than 0.010 inches (0.025 centimeters) and preferably within a range of 0.025 inches (0.064 centimeters) to 0.030 inches (0.076 centimeters).

The inner and outer walls 80, 82 may be made of a heat resistant and resiliently flexible metal such as a nickel based or cobalt based alloy for the gas turbine engine application illustrated. For other applications, the walls 80, 82 may be made of any number of materials provided such material meets operating parameters of the application. Such parameters may include temperature and pressure differential across the seal assembly 78.

In operation, the dual walled seal assembly 78 may provide a more robust seal than a single walled seal. For instance, the inner wall 82 may be exposed to the elevated temperatures of the engine core flowpath 74 that may exceed temperatures of 2,000 degrees Fahrenheit (1,093 degrees Celsius). During normal operation, limited cooling air may flow from the secondary cooling flowpath 76 through the splice 122 of the outer wall 82 and into the annular cavity 84. The limited cooling air may then flow circumferentially between the walls 80, 82, thereby cooling the walls, before flowing into the engine core flowpath 74 from the splice 120 of the inner wall 80. If (and due in-part to the elevated temperatures of the core flowpath), the inner wall 80 should fail to any degree such as the propagation of a crack in either of the bend portions 90, 92, cooling air from the splice 122 and the metering apertures 86 of the outer seal 82 will generally flow more cooling air to the undesired crack and thereby limit or prevent further propagation of the crack which could cause degradation of sealing effectiveness and ultimately lead to a more severe failure causing domestic object damage and/or requiring replacement or repair of the seal assembly that much sooner.

Generally during normal operating conditions and to reduce leakage flow at the entrance of the splice 122 of the outer wall 82, the spacers 116 may be recessed from the end faces 128, 130, and the faces or the circumferential end portions of the outer wall 82 may be shaped to contact (or come in closer proximity to) the inner wall 80 (not shown). That is, the cavity 84 is circumferentially closed-off by the end portions of the outer wall 82, thereby preventing or further limiting air flow from the secondary cooling flowpath 76 and into the cavity 84 via the splice 122.

Figure 6:
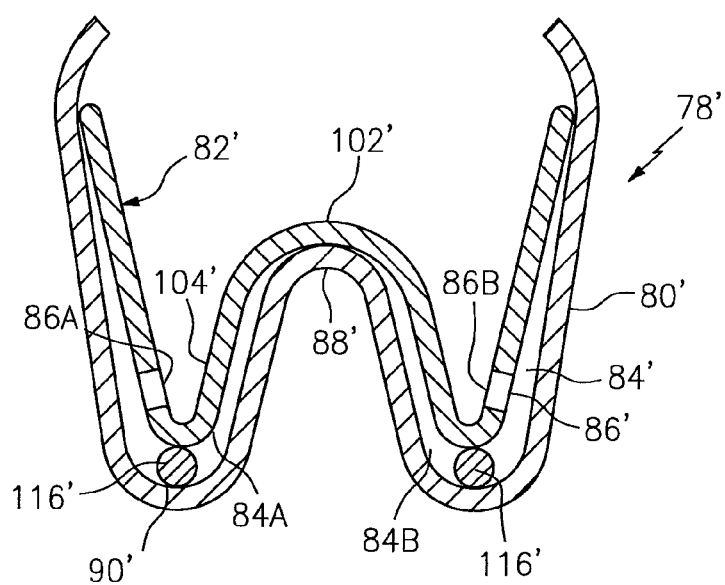
FIG. 6 is a cross section of a third embodiment of the seal assembly similar in perspective to FIG. 3.

Referring to FIG. 6, a second embodiment of the seal assembly is illustrated wherein like elements have like identifying numerals except with the addition of a prime symbol. A seal assembly 78' of the second embodiment has a mid-bend portion 88' of an inner wall 80' that is in contact with a mid-bend portion 102' of a perforated outer wall 82'. A cavity 84' defined between the walls 80', 82' is thus divided into an upstream cavity 84A and a downstream cavity 84B (i.e. the two cavities 84A, 84B are generally not in direct fluid communication with one-another). A plurality of metering apertures 86' in the outer wall 82' has a plurality of apertures 86A in an upstream bend portion 104' that are in fluid communication with the cavity 84A and a plurality of apertures 86B in a downstream bend portion 106' are in fluid communication with the cavity 84B. If a failure or crack should occur, for example, in an upstream bend portion 90' of the inner wall 80' only cooling air from the apertures 86A (and not from apertures 86B) will controllably flow to the crack to limit propagation. Controlling the flow of cooling air in such a way will limit excessive cooling air leakage and mitigate engine operating inefficiencies as a result of the crack.

The contact between the mid-bend portions 88', 102' may be a releasable contact and spacers 116' may be located in the respective cavities 84A, 84B to maintain proper clearances for cooling air flow. Alternatively, the two mid-bend portions 88', 102' may be rigidly engaged or adhered to one-another and depending upon the flexibility, rigidity and/or strength of the walls 80', 82' the spacers may not be required.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed:

1. A turbine engine seal assembly for a turbine section of an engine having a central longitudinal axis, comprising:
    a shroud ring concentric to the axis;
    a blade outer air seal ring concentric to the axis and spaced axially aft of the shroud ring with respect to the axis;
    a circumferentially extending outer wall including a plurality of metering apertures spaced circumferentially from one-another, and the outer wall being in resilient sealing relationship between the shroud ring and the blade outer air seal ring;
    a circumferentially extending inner wall spaced at least in part radially inward from the outer wall and resiliently compressed between the shroud ring and the blade outer air seal ring;
    wherein a circumferentially extending cavity is defined between the outer and inner walls that is in fluid communication with the plurality of apertures,
    wherein the outer and inner walls are generally W-shaped in cross section and each have a mid-bend located axially between upstream and downstream bend portions of each outer and inner wall, and
    wherein a mid portion of the inner wall is in contact with a mid portion of the outer wall, and the cavity is an upstream cavity defined between the upstream bend portions, and a downstream cavity is defined between the downstream bend portions, and the plurality of apertures are in the upstream and downstream bend portions of the outer wall.

2. The turbine engine seal assembly set forth in claim 1, wherein the outer wall is located generally between a secondary cooling flowpath and the cavity, and the inner wall is located between the cavity and an engine core flowpath.

3. The turbine engine seal assembly set forth in claim 1, wherein the circumferentially extending inner wall has no apertures.

* * * * *